United States Patent Office 3,310,586
Patented Mar. 21, 1967

3,310,586
PROCESS OF MAKING 3,4-DIHYDRO-1(2H)-NAPHTHALENONES
Allan S. Hay, Schenectady, N.Y., assignor to General Electric Company, a corporation of New York
No Drawing. Filed Feb. 14, 1963, Ser. No. 258,615
10 Claims. (Cl. 260—590)

This invention relates to the oxidation of 1,2,3,4-tetrahydronaphthalene including the methyl and dimethyl-substituted 1,2,3,4-tetrahydronaphthalenes to the corresponding 3,4 - dihydro - 1(2H) - naphthalenones. More particularly, the invention relates to the process of preparing 3,4-dihydro-1(2H)-naphthalenones which comprises reacting oxygen with a 1,2,3,4-tetrahydronaphthalene selected from the group consisting of 1,2,3,4-tetrahydronaphthalene and a 1,2,3,4-tetrahydronaphthalene having from one to two methyl groups as the sole substituents in a homogeneous liquid phase containing no more than 5% by weight water and having dissolved therein a catalyst consisting essentially of a cobalt bromide carboxylate.

Ordinarily, when oxygen is reacted with a 1,2,3,4-tetrahydronaphthalene which has two —CH$_2$— groups alpha to the aryl nucleus, it is necessary to heat the reaction mixture with the product being a mixture of 3,4-dihydro-1(2H)-naphthalenone and tetrahydronaphthol, as well as other oxidation products. Even in the presence of oxidation catalysts, many other oxidation products are formed and apparently inhibit further oxidation of the 1,2,3,4-tetrahydronaphthalene. Apparently, a by-product is formed in the mixture of products which causes the reaction to stop after about one-fifth to one-third of the theoretical amount of oxygen has been reacted.

Unexpectedly, I have now found that if I react oxygen with a 1,2,3,4-tetrahydronaphthalene and specifically 1,2,3,4-tetrahydronaphthalene itself, methyl-1,2,3,4-tetrahydronaphthalenes and dimethyl-1,2,3,4-tetrahydronaphthalenes having two —CH$_2$— groups alpha to the aryl nucleus (generally hereinafter also referred to as "α-methylene groups") in the presence of a cobalt bromide carboxylate catalyst, the reaction of oxygen with one of the α-methylene groups to produce the 3,4-dihydro-1(2H)-naphthalenone is so vigorous that even if the reaction is carried out at ambient atmospheric temperature and pressure conditions, sufficient heat is evolved to cause a noticeable rise in temperature of the reaction mixture, providing a sufficient quantity of oxygen is supplied that the reaction mixture is not starved for oxygen. As disclosed and claimed in my copending application, Ser. No. 258,616, now Patent No. 3,256,354 filed concurrently herewith and assigned to the same assignee as the present invention, if the same reaction is carried out at ambient atmospheric temperature and pressure conditions and the flow of oxygen is moderated so that there is no self-heating of the reaction mixture, the major product, instead of being an 3,4-dihydro-1(2H)-naphthalenone, is an α,β-dihydronaphthalene. Surprisingly enough, the process of the present invention produces only very small amounts of by-products. The α-methylene group present in the 3,4-dihydro-1(2H)-naphthalenone is not as readily oxidized as the α-methylene group of the 1,2,3,4-tetrahydronaphthalene. As the amount of the 1,2,3,4-tetrahydronaphthalene having two α-methylene groups decreases due to the conversion into the corresponding 3,4-dihydro-1(2H)-naphthalenone, this second α-methylene group of the 1,2,3,4-tetrahydronapthalene starts to oxidize to produce a diketone which can isomerize, if there is one hydrogen on each of the carbon atoms beta to the aryl nucleus, into the corresponding dihydroxynaphthalene which acts as an inhibitor in my oxidation reaction. Apparently, only a small quantity of this dihydroxynaphthalene needs to be formed to completely stop the reaction. When this happens, I have found that I may isolate the 3,4-dihydro-1(2H)-naphthalenone and recover the unconverted 1,2,3,4-tetrahydronapthalene which may then be further oxidized in an additional reaction. However, I have found that I may add a compound which is less readily oxidized than the 1,2,3,4-tetrahydronaphthalene itself, but more readily oxidized than the 3,4-dihydro-1(2H)-naphthalenone to the diketone before any of the inhibitor is formed and preferably at the start of the reaction. The effect of this added compound is that the —CH= group alpha to the aryl nucleus of the added compound is oxidized to a carboxylic acid if the alkyl group is methyl and to a ketone if the alkyl group has two or more carbon atoms, in preference to the α-methylene group in the 3,4-dihydro-1(2H)-naphthalenone, i.e., second methylene group in the 1,2,3,4-tetrahydronaphthalene, preventing the formation of the dihydroxynaphthalene inhibitor. If the 1,2,3,4-tetrahydronaphthalene has two methyl groups on either one of the carbon atoms beta to the aryl nucleus, e.g., 2,2-dimethyl-1,2,3,4-tetrahydronaphthalene, the diketone cannot isomerize to the dihydroxynaphthalene. But in either case the unreacted 1,2,3,4-tetrahydronaphthalene can be oxidized under such conditions so that a higher conversion of the 1,2,3,4-tetrahydronaphthalene to 3,4-dihydro-1(2H)-naphthalenone can be accomplished in a single oxidation step. The alkyl-substituted aryl hydrocarbons, i.e., aryl hydrocarbons having one or more alkyl substituents on the aryl nucleus, commonly called an alkaryl hydrocarbon, are ideally suited for adding to the reaction mixture to prevent the formation of the dihydroxynaphthalene inhibitor.

The above reactions may be represented by the following equations:

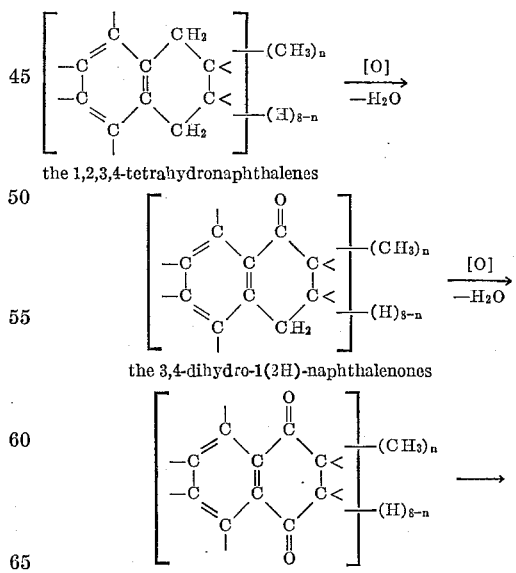

the diketones

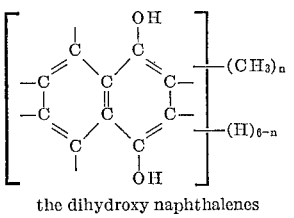

the dihydroxy naphthalenes where $n$ is one of the integers 0, 1, 2.

Using 1,2,3,4-tetrahydronaphthalene as an example, the nomenclature system used to designate the carbon atoms of the 1,2,3,4-tetrahydraonapthalenes and 3,4-dihydro-1(2H)-naphthalenones of this invention are as follows:

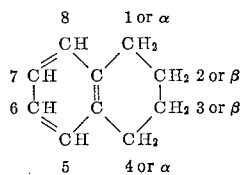

The catalyst for these reactions is so unique and specific that the omission or substitution of one component renders the catalyst substantially inactive. Thus, the omission of bromine or the complete substitution of other closely related components such as copper, iron, etc., for cobalt, and iodine or chlorine for bromine, etc., renders the catalyst inactive.

In carrying out the process of the present invention, the 1,2,3,4-tetrahydronaphthalene, methyl-1,2,3,4-tetrahydronaphthalene or dimethyl-1,2,3,4-tetrahydronaphthalene (generally referred to herein as "the 1,2,3,4-tetrahydronaphthalenes") are liquids and therefore may be used alone, but desirably they are dissolved in a suitable solvent along with the alkaryl hydrocarbon if it is to be present. The catalyst consisting essentially of a cobalt bromide carboxylate is dissolved in the liquid phase. If a solvent is used it may be the same compound which is a product of the oxidation reaction, or it may be a carboxylic acid such as the lower alkyl carboxylic acids, for example, acetic acid, propionic acid, anhydrides of such acids, etc. Oxygen is passed into the liquid phase in a suitable reaction vessel, preferably maintained at ambient atmospheric temperature and pressure conditions, although lower or higher temperatures and lower or higher pressures may be used if desired. The flow of oxygen introduced into the reaction mixture is regulated so that the reaction mixture is heated from the exothermic reaction occurring from the reaction of the oxygen with the 1,2,3,4-tetrahydronaphthalene. When the reaction is carried out at room temperature, the reaction mixture will show a definite rise in temperature allowing one to readily recognize when sufficient oxygen is being passed into the reaction mixture.

Since the reaction occurs so readily and is so exothermic, there is really no need to heat the reaction mixture externally, since this makes the reaction even more vigorous and if hot enough, difficult to control. This is especially true if large quantities of the 1,2,3,4-tetrahydronaphthalene are being oxidized which in some cases might even require application of external cooling to prevent the reaction from flooding the reflux condenser normally used to return volatilized materials to the reaction mixture. Also, to carry out the reaction at less then room temperature would also require cooling, adding to the cost of the process without providing any benefit. I normally prefer to carry out the oxidation reaction at ambient atmospheric temperature and pressure conditions, since, under these conditions a very rapid and clean reaction is obtained. The flow of oxygen is continued until the desired amount of 1,2,3,4-tetrahydronaphthalene is oxidized. I usually prefer to continue the flow of oxygen until no more oxygen is absorbed or the exothermic reaction is completed as indicated by the reaction mixture showing a definite drop from the highest temperature reached during the reaction. By monitoring both the incoming and exit stream of gas, it can be readily determined when no more oxygen is absorbed and the reaction is complete.

After the reaction is completed, or the desired degree of reaction has occurred, the 3,4-dihydro-1(2H)-naphthalenone is separated from the reaction mixture by conventional methods. The process can also be carried out in a continuous manner by continuously adding both the 1,2,3,4-tetrahydronaphthalene and oxygen to a solution of the cobalt bromide carboxylate in a suitable solvent. Alternatively, a part of the catalyst can be present in one part of the system while the other part of the catalyst is added with the reactant. Thus, a cobalt carboxylate can be present in the solvent and the bromine constituent added with the 1,2,3,4-tetrahydronaphthalene. By reusing the mother liquid of a prior run in a subsequent run, one can continuously reuse the catalyst.

The term "1,2,3,4-tetrahydronaphthalene having two α-methylene groups and one methyl group as the sole substituent" refers to 1,2,3,4-tetrahydronaphthalene in which the hydrogens on the two carbon atoms which are alpha to the aryl nucleus are unsubstituted and one of any of the other ring hydrogens of either the saturated or unsaturated ring of the 1,2,3,4-tetrahydronaphthalene is substituted with a methyl group. The term "1,2,3,4-tetrahydronaphthalene having two α-methylene groups and two methyl groups as its sole substituents" is used to designate 1,2,3,4-tetrahydronaphthalene in which the hydrogens on the two carbon atoms which are alpha to the aryl nucleus are unsubstituted and any two of the other hydrogens on either the saturated or unsaturated ring of the 1,2,3,4-tetrahydronapthalene are substituted by two methyl groups, i.e., 1-methyltetralin, 1-methyl-1,2,3,4-tetrahydronaphthalene, 1,3-dimethyl-1,2,3,4-tetrahydronaphthalene, 1,4-dimethyl-1,2,3,4-tetrahydronaphthalene, etc., are not included within the scope of this invention since they do not have two α-methylene groups. Typical examples of the methyl-1,2,3,4-tetrahydronaphthalenes and dimethly-1,2,3,4-tetrahydronaphthalenes within the scope of this invention are, by way of example, 2-methyl-1,2,3,4-tetrahydronapthalene, 5-methyl-1,2,3,4-tetrahydronapthalene, 6-methyl-1,2,3,4-tetrahydronaphthalene, 2,2-dimethyl-1,2,3,4-tetrahydronaphthalene, 2,5-dimethyl-1,2,3,4-tetrahydronaphthalene, 2,6-dimethyl-1,2,3,4-tetrahydronaphthalene, 2,3-dimethyl-1,2,3,4-tetrahydronaphthalene, 5,6-dimethyl-1,2,3,4-tetrahydronaphthalene, 5,7-dimethyl-1,2,3,4-tetrahydronaphthalene, 5,8-dimethyl-1,2,3,4-tetrahydronaphthalene etc.

As a general rule, when oxygen is reacted with the 1,2,3,4-tetrahydronaphthalene so that there is a definite heating of the reaction mixture, the oxygen attacks the hydrogen-carbon bond of the saturated α-carbon atom adjacent to the aryl nucleus of the 1,2,3,4-tetrahydronaphthalene with the formation of the corresponding 3,4-dihydro-1(2H)-naphthalenone with water being a by-product. As will be readily apparent both the 1- and 4- carbon atoms are alpha to the aryl nucleus in 1,2,3,4-tetrahydronaphthalene. In the case of 1,2,3,4-tetrahydronaphthalene itself, whether it is the 1- or 4- carbon atom which is initially attacked, is immaterial, since the oxidation product would still be the same 3,4-dihydro-1(2H)-naphthalenone. In the case of the methyl-1,2,3,4-tetrahydronaphthalenes and dimethyl-1,2,3,4-terahydronaphthalenes, the products would still be 3,4-dihydro-1(2H)-naphthalenones but the products will be a mixture of the two possible 3,4-dihydro-1(2H)-naphthalenones with the proportions of the two possible isomers being dependent on influence of the methyl substituent on the reactivity of the α-methylene group.

It is to be recognized that the compound which might be named 4-methyl-1,2,3,4-tetrahydronaphthalene is actually in fact the same as 1-methyl-1,2,3,4-tetrahydronaphthalene according to the present rules of nomenclature. Likewise, 3-methyl-1,2,3,4-tetrahydronaphthalene is actually 2 - methyl - 1,2,3,4 - tetrahydronaphthalene, 8-methyl-1,2,3,4-tetrahydronaphthalene is actually 5-methyl - 1,2,3,4 - tetrahydronaphthalene, 2,4 - dimethyl-1,2,3,4-tetrahydronaphthalene is actually 1,3 - dimethyl - 1,2,-3,4-tetrahydronaphthalene, etc. Since both the aryl nucleus and the methyl group activate the α-carbon atom which will be attacked in the oxidation reaction, if there are two α-methylene groups it will be the —CH$_2$— group which is nearest to both the aryl nucleus and the methyl group which will be preferentially attacked except in the case of 6-methyl-1,2,3,4-tetrahydronaphthalene, in which case the α-methylene group in the 1- position is preferentially oxidized. For example, the oxidation of 2-methyl-1,2,3,4-tetrahydronaphthalene in my reaction will produce 2-methyl-3,4-dihydro-1(2H)-naphthalenone as the main product mixed with a minor amount of 3-methyl-3,4-dihydro-1(2H)-naphthalenone.

Since the 3,4-dihydro-1(2H)-naphthalenones produced by my process are useful for being dehydrogenated to the corresponding naphthols which are useful as antioxidants, it is not necessary in those cases where a mixture of two 3,4-dihydro-1(2H)-naphthalenones are produced to separate the two isomers prior to use, since the mixture is as useful as the pure compounds. However, separation of the two isomers can be accomplished if desired by conventional means.

The cobalt bromide carboxylate catalyst is a unique catalyst for my reaction. All of these components are essential to produce an active catalyst. Neither cobalt bromide nor a cobalt carboxylate is an effective catalyst by itself. The combination is so unique that the substitution of other elements for one or more components either totally stops or substantially impedes the reaction. Thus, little catalytic action is obtained when appreciable amounts of other substances which usually make excellent oxidation catalysts are present during the reaction. For example, the presence of appreciable amounts of dissolved cation compounds of iron, copper, etc., in the reaction mixture substantially stops the reaction. Similarly, the presence of appreciable amounts of anions such as sulfate, nitrate, chlorate, etc., ions inhibit the activity of this unique catalyst. These substances interfere with the reaction only when present in ionic form and then because they react with the catalyst to form cobalt compounds which are not catalytically reactive. Therefore, they only completely inactivate the catalyst when they are present in amounts which are chemically equivalent to the amount of cobalt present as the catalyst. Compounds which contain such groups of substituents which do not produce these groups in ionic form during the reaction will not interfere with the reaction and if they do not produce such ions in sufficient quantity to completely inactivate the catalyst, they will retard but not stop the reaction. Because of this, I prefer to use a reaction mixture including the catalyst system which is essentially free of any components which impede the reaction. The substitution of other halogens such as chlorine for bromine imparts to the catalyst no appreciably greater catalytic activity than is found in the cobalt acetate alone. The presence of iodine in elemental or ionic form completely inactivates the catalyst, but may be present in compounds, for example, as a nuclear substituent on aryl compounds which do not release iodine in elemental or ionic form during the reaction. Since the normal reactants do not contain such interfering materials, it is easy to exclude them from the reaction mixture.

The atomic ratio of cobalt to bromine is important for maximum reaction rates. The most active form of catalyst is that where the cobalt bromide carboxylate is present in a form where there is one cobalt ion, one bromine ion and at least one carboxylate ion. Excess of carboxylate ions, for example, in the form of an additional carboxylic acid, has no effect whatsoever on the catalyst activity, but this is not true of the ratio between the cobalt and bromine ions. Optimum reaction rates are obtained when the cobalt and bromine are present in substantially equal atomic amounts (i.e., 0.9–1.1 atoms of bromine per atom of cobalt). A ratio of one atom of bromine per atom of cobalt represents a catalyst having a maximum reactivity. Such a ratio may be obtained by either mixing 1 mole of cobalt bromide with 1 mole of a cobalt carboxylate or by adding 1 mole of bromine or bromine engendering agent to 1 mole of a cobalt carboxylate. It is believed that the bromine supplied either from bromine itself or from the bromine engendering agent, e.g., hydrogen bromide or a bromocarboxylic acid, etc., reacts with the cobalt carboxylate to form a cobalt bromide carboxylate. Likewise, the mixture of cobalt bromide and cobalt carboxylate equilibrates and reacts as though it were a cobalt bromide carboxylate.

It is thus readily seen that a ratio greater than 1 atom of bromine per atom of cobalt obtained by adding greater than 1 mole of the bromine-containing compound in effect decreases the concentration of the active species of the catalyst and therefore decreases the reaction rate in the same way as would be obtained if less cobalt bromide carboxylate had been added initially. The effect of adding sufficient bromine to give a ratio of 2 atoms of bromine per atom of cobalt would be the same as adding cobalt bromide itself to the reaction mixture and such a material is completely inactive as a catalyst for my reaction. Likewise, if insufficient bromine compound is added, to supply an atomic ratio of 1 atom of bromine per atom of cobalt, the catalyst concentration is again decreased with the same effect on the reaction rate, since the excess cobalt carboxylate not converted to the cobalt bromide carboxylate has no catalytic effect.

The rate of reaction decreases rapidly as the bromine-to-cobalt atomic ratio is increased and conversely, as the bromine-to-cobalt atomic ratio is decreased from unity, there is a decrease in activity, although this decrease is less marked. I have found that a bromine-to-cobalt atomic ratio of 2, i.e., 2 atoms of bromine per atom of cobalt, substantially stops the reaction and that the reaction proceeds at a slow rate even at as low a ratio as 0.08. Although in practice I prefer to use ratios of about 0.3–1 atom of bromine per atom of cobalt, ratios of 0.1–1.2 atoms of bromine per atom of cobalt give satisfactory results. However, ratios in the range of 0.08–1.9 atoms of bromine per atom of cobalt can be used. Although an initial bromine-to-cobalt atomic ratio of 2 substantially stops the reacton, bromine losses may occur during the reaction or during a continuous or multicycle reaction wherein the mother liquid is continuously reused, thus permitting the addition of more bromine if desired. However, the catalytically effective bromine-to-cobalt ratios should not be greater than 1.9 and preferably not greater than 1.2.

As stated previously the molar ratios of the carboxylic acid to cobalt has no upper limit, with the result that carboxylic acids can be employed as solvents for the reaction. The carboxylate ion constituent of the catalyst is generally furnished as the carboxylate salt of cobalt, but may be formed in situ by the reaction of a cobalt salt with a carboxylic acid, carboxylic anhydride, etc. To produce some of the carboxylate ion and all of the bromine ion of the catalyst an acid bromide may be used.

The cobalt constituent of the catalyst is furnished by cobalt compounds in the divalent or trivalent state. Most simple cobalt salts can be isolated as stable solids only in the form of divalent salts, but trivalent cobalt salts such as cobaltic acetate, cobaltic hydroxide, cobaltic carbonate, are known. The latter two compounds and the corresponding cobaltous hydroxide and carbonate as well as the oxides of cobalt are a convenient source of cobalt for the catalyst when it is desired to form the catalyst by reaction with a carboxylic acid which is to be used as the solvent. Specific divalent cobalt compounds include cobalt bromide and cobalt salts of carboxylic acids which may be the same or different carboxylic acid used as the solvent. Where the reaction is carried out in the presence of a large amount of a carboxylic acid, for example, acetic acid, cobalt, regardless of its initial form, generally takes the form of the salt of the carboxylic acid used as solvent in the reaction mixture, e.g., the acetate when acetic acid is the solvent. Therefore, any cobalt salt of the type described which is soluble in the solvent employed in an amount sufficient to form a catalyst and does not introduce interfering ions is satisfactory for the process. Because of its availability, the preferred source of cobalt is cobaltous acetate tetrahydrate which may be used in conjunction with cobalt bromide. However, other suitable cobalt catalysts include the cobaltous salts of other aliphatic acids as for example, cobaltous propionate, cobaltous butyrate, cobaltous 2-chlorobutyrate, cobaltous hydroxystearate, cobaltous succinate, the mono-cobalt salt of succinic acid, the cobalt salt of the monoethyl ester of succinic acid, cobaltous levulinate (a cobaltous salt of a hydrocarbon carboxy acyl substituted carboxylic acid), cobaltous tartrate, cobaltous ethoxybutyrate, etc. In addition, cobaltous salts of aromatic carboxylic acids may also be employed as catalysts. Thus, I can employ salts such as cobaltous benzoate, cobaltous (ethylthio)benzoate, cobaltous (methylsulfinyl)benzoate, cobaltous (phenylsulfonyl)benzoate, cobaltous fluorobenzoate, cobaltous chlorobenzoate, cobaltous bromobenzoate, cobaltous iodobenzoate, cobaltous toluate, cobaltous terephthalate, the monocobalt salt of isophthalic acid, the cobalt salt of the monomethyl ester of o-phthalic acid, cobaltous naphthalenecarboxylate, etc. Inorganic cobalt salts of anions that inactivate the catalyst should be avoided, for example, cobalt salts containing sulfate, nitrate, iodide, iodate, chlorate, etc., ions.

The bromine constituent of the catalyst is generally furnished by bromine compounds containing bromine capable of being readily removed from the parent compound, i.e., compounds containing a labile bromine atom. Such compounds are precursors of bromine or hydrogen bromide, which is formed during the oxidation reaction to supply the bromine constituent of the catalyst. Specific compounds, include the bromocarboxylic acids, for example, the bromoaliphatic acids, e.g., the bromoacetic acids, the bromopropionic acids, the bromobutyric acids, the bromosuccinic acids, etc., cycloaliphatic carboxylic acids containing removable bromine, for example α-bromocyclohexanecarboxylic acid, etc.; free bromine (i.e., Br$_2$); acid bromides, for example, acetyl bromide, etc.; bromocarbons containing bromine capable of being readily removed from the parent compound, for example, bromochloroform, etc.; hydrogen bromide, cobalt bromide, etc. I have found that one mole of HBr per mole of cobalt acetate produces an extremely active catalyst.

A wide variety of solvents may be employed in the reaction with maximum yields being obtained with inert solvents which do not adversely affect the reaction, and in which both the reactant and catalyst are soluble, for example, aromatic and aliphatic hydrocarbons, esters, etc. However, solvents which are oxidized during the reaction, e.g., the starting material, ketones, etc., may likewise be used as solvents. When the starting material is used as solvent, the product becomes the solvent during the latter part of the reaction. Because carboxylic acids make excellent solvents for both the reactant and catalyst, they are the preferred solvents. Since carboxylic acids form part of the catalyst and there is no upper limit to the amount of carboxylic acid the reaction will tolerate, these solvents can be used as the source of the carboxylate ion constituent of the catalyst, as well as the solvent. For obvious reasons, it is highly desirable to use a liquid carboxylic acid, although solid carboxylic acids can be used in conjunction with other solvents under liquefying conditions. Thus, benzoic acid dissolved in benzene or in the 1,2,3,4-tetrahydronaphthalene starting material may be used as a combined solvent and source of carboxylate ion constituent for the catalyst system. Examples of other carboxylic acids comprise aliphatic carboxylic acids, for example, the acids corresponding to the carboxylate portion of the cobalt salts previously named, e.g., acetic, propionic, butyric, succinic, tartaric, levulinic, bromobutyric, etc., acids, cycloaliphatic carboxylic acids, for example, naphthenic acid, cycloalkane carboxylic acid, etc. In addition, carboxylic acid precursors such as carboxylic anhydrides, for example, acetic anhydride, etc., can also be employed. These anhydrides can serve as solvents or in conjunction with other solvents and additionally serve as a means for removing water formed during the reaction. Mixtures of these acids with other solvents can also be employed. For example, mixtures of acetic acid with acetophenone, etc. As a class, the lower aliphatic carboxylic acids are preferred as solvents. The specific lower carboxylic acids preferred are acetic and propionic acids.

From the above discussion it is seen that the catalyst constituents can be selected from a wide variety of starting materials. A single compound which would meet all the requirements of the catalyst would be a cobalt salt of both hydrogen bromide and a carboxylic acid, for example cobalt acetate bromide. However, these compounds are not readily available and offer no advantage over a binary mixture of equimolar amounts of a cobalt salt of a carboxylic acid, for example, cobalt acetate, etc., and a bromine compound, for example, cobalt bromide, hydrogen bromide, bromine, etc. All of these would give a ratio of one atom of bromine to one atom of cobalt, i.e., a bromine-to-cobalt ratio of 1, but by varying the proportions in the binary mixture any desired ratio may be obtained. Ternary mixtures may be used to form the catalyst. For example, cobalt oxides, hydroxides, or carbonates and a bromine compound, for example, hydrogen bromide, bromine, cobalt bromide, etc., may be dissolved in a carboxylic acid to produce the catalyst.

The alkaryl hydrocarbon to be added to the reaction mixture to suppress the formation of the diketone and dihydroxynaphthalene may be any of the alkaryl compounds having at least one alkyl substituent on the aryl nucleus which has an α-hydrogen, i.e., at least one of the alkyl substituents must have a —CH= group alpha to the aryl nucleus. Typical examples of such alkyl groups are: methyl, ethyl, propyl, isopropyl, butyl, isobutyl, cyclohexyl, octyl, decyl, hexadecyl, eicosyl, etc. The aryl nucleus may also have other substituents, e.g., chlorine, bromine, iodine, fluorine, isopropyl, tert-butyl, nitro, etc. The aryl nucleus may be a benzene, naphthalene, anthracene, etc., nucleus. Because the substituents other than the alkyl groups having an α-hydrogen atom, do not suppress the diketone formation, I prefer to use an alkaryl hydrocarbon wherein the alkyl substituents have from 1 to 8 carbon atoms and wherein from one to the total number of replaceable hydrogens of the aryl nucleus are substituted with an alkyl group, e.g., toluene, the various xylenes, i.e., o-xylene, m-xylene, p-xylene, the tri-, tetra-, penta- and hexamethylbenzenes, the ethylbenzenes, ethyl-methylbenzene, propylbenzene, isopropylbenzene, octylbenzene, methyl-t-butylbenzene, methyl naphthalenes, ethyl naphthalenes, methyl anthracenes, etc., and mixtures thereof. The most readily available are those alkaryl hydrocarbons from coal tar and petroleum, especially the mixture sold as "xylene" which is a mixture of the various xylene isomers with ethylbenzene.

Any amount of these alkaryl compounds may be used. As has been pointed out previously, the reaction will proceed in the absence of the alkaryl compound up to the point where the reaction is stopped by the formation of the dihydroxynaphthalene. Any amount will therefore aid the reaction to produce more of the 3,4-dihydro-1 (2H)-naphthalenone. Since the 1,2,3,4 - tetrahydronaphthalene is more readily oxidized than the alkaryl compound, the latter will not hinder the reaction even if present in large quantities. Generally, I prefer to use the alkaryl compound in the amount of from 1 to 50 mole percent of the 1,2,3,4-tetrahydronaphthalene in the reaction mixture but higher or lower amounts may be used, if desired, e.g., the alkaryl compound can be used as the solvent for the reaction mixture.

It is to be recognized that the alkaryl compound itself which is oxidized in the reaction produces useful acids when the alkyl group is methyl and useful ketones when the alkyl group has two or more carbon atoms. These useful products may be isolated by conventional means from the reaction mixture, as well as the unconverted alkaryl compound.

As has been pointed out previously, the rate of oxygen addition to the reaction mixture is critical and must be fast enough that there is heating of the reaction mixture due to the oxidation reaction. It should be understood that in addition to employing a free oxygen as the oxidizing agent in my process, it is also possible to employ an oxygen-containing gas in which the ingredient other than oxygen is inert under the conditions of the reaction. For example, oxygen mixed with such inert gases as helium, neon, xenon, krypton, argon, etc., as diluents with the oxygen in feed gas. However, the most convenient source of oxygen is air itself.

The temperature of the reaction in accordance with the present invention may vary within very wide limits. The reaction occurs very rapidly at temperatures as low as room temperature (i.e., about 25° C.), but may be carried out at temperatures up to the reflux temperature of the reaction mixture, if desired.

In the oxidation of the 1,2,3,4-tetrahydronaphthalenes to 3,4-dihydro-1(2H)-naphthalenones, one of the products of reaction is water. In carrying out the reaction it is found that the presence of a large amount of water has an adverse effect on the rate of reaction. Thus, when an amount of water in excess of about 0.05 part by weight per part of solvent is allowed to accumulate, the reaction is substantially stopped. Therefore, I prefer to carry out the reaction under nearly anhydrous conditions and with a maximum of about 0.05 part water per part solvent (5% by weight). Minute traces of water are often desirable, since these help solubilize the cobalt constituent of the catalyst, e.g., cobalt acetate. Thus, cobalt acetate tetrahydrate is very soluble in acetic acid, while anhydrous cobalt acetate is only slightly soluble. However, anhydrous cobalt acetate is quite soluble in acetic acid when hydrogen bromide is present. Removal of water during the reaction is readily accomplished by allowing water to distill from the reaction mixture as it it formed, by incorporation of desiccants, or by use of acid anhydrides. The effect of water can also be minimized by keeping the ratio of the 1,2,3,4-tetrahydronaphthalene to solvent low. Azeotropic agents such as benzene, heptane, etc., can also be used in removing water from the reaction mixture.

The catalyst will be effective in the oxidation of the 1,2,3,4-tetrahydronaphthalenes regardless of the amount present in the reaction mixture at any given time. However, since the oxidation will be extremely rapid and water is a product of the reaction, a controlling factor on the rate of oxidation is the rate at which water is removed. Any amount of the 1,2,3,4-tetrahydronaphthalene can be present during the reaction, provided the water content of the reaction mixture is no greater than 5% by weight of solvent. In practice, I have obtained satisfactory results by employing in the starting mixture from 0.01 to 0.5 part by weight of the 1,2,3,4-tetrahydronaphthalene per part of solvent or by using the 1,2,3,4-tetrahydronaphthalene as its own solvent. Preferably, my reaction mixture at the start contains from 0.02 to 0.3 part by weight of the 1,2,3,4-tetrahydronaphthalene per part of solvent. It is obvious that when the 1,2,3,4-tetrahydronaphthalene is not its own solvent, the ratio of 1,2,3,4-tetrahydronaphthalene to solvent will vary during the course of the reaction, since the 1,2,3,4-tetrahydronaphthalene is being continuously oxidized. Slow addition of 1,2,3,4-tetrahydronaphthalene to the reaction mixture is one method of keeping the water content low.

The following examples are illustrative of the practice of my invention, and are not intended for purposes of limitation. In the examples, all parts are by weight.

*Example 1*

A solution was made up containing the following ingredients: 66 grams of 1,2,3,4-tetrahydronaphthalene, 10 grams of cobalt acetate tetrahydrate, 10.8 grams of a 30% solution of hydrogen bromide in acetic acid and 250 ml. of acetic acid. The solution was contained in a reaction flask equipped with a reflux condenser which also served as a vent for the oxygen. The flask was immersed in a water bath maintained at 30° C. Oxygen was bubbled through the vigorously stirred solution at the rate of about 600 ml. per minute. During the reaction time of 70 minutes, the temperature rose to a maximum of 43° C. due to the exothermic reaction of the oxygen with the 1,2,3,4-tetrahydronaphthalene, but at the end of the reaction period the temperature of the reaction mixture had returned to the bath temperature, and no appreciable amount of oxygen was being absorbed, showing that no more reaction was occurring. The reaction mixture was mixed with a large volume of water which was then extracted with ether. The ether layer was washed with sodium bicarbonate solution, dried with a desiccant and then the ether removed by volatilization on a steam bath. Analysis of the product showed that of the initial 66 grams of 1,2,3,4-tetrahydronaphthalene, 18.2% remained unreacted, 46% had been converted to 3,4-dihydro-1(2H)-naphthalenone (1-ketotetrahydronaphthalene), and 15% had been converted to 1,2-dihydronaphthalene. Based on the 1,2,3,4-tetrahydronaphthalene oxidized there was a 58% yield of 3,4-dihydro-1(2H)-naphthalenone and an 18% yield of 1,2-dihydronaphthalene.

*Example 2*

Example 1 was repeated except that 21 grams of ethyl benzene were also added to the reaction mixture. In this case, the exothermic reaction heated the reaction mixture to a maximum of 52° C. Analysis of the product showed that 16.7% of the initial 1,2,3,4-tetrahydronaphthalene remained unoxidized, 49% had been converted to 3,4-dihydro-1(2H)-naphthalenone and 16% had been converted to 1,2-dihydronaphthalene. Based on the 1,2,3,4-tetrahydronaphthalene oxidized, there was a yield of 58.5% 3,4-dihydro-1(2H)-naphthalenone and 19% 1,2-dihydronaphthalene.

When this reaction was carried out in an open reaction vessel, although the reaction was slower requiring 250 minutes for completion, with the maximum temperature being reached at 38° C., the yields of 3,4-dihydro-1(2H)-naphthalenone were increased so that 58% of the initial 1,2,3,4-tetrahydronaphthalene was converted to α-tetralone. Based on the 1,2,3,4-tetrahydronaphthalene oxidized, a yield of 68% of 3,4-dihydro-1(2H)-naphthaleone was obtained.

*Example 3*

When Example 1 was repeated except adding 21 grams of xylene to the reaction mixture, the maximum temperature obtained during the reaction was 49° C. Analysis of the reaction mixture showed that 14% of the initial 1,2,3,4-tetrahydronaphthalene was unoxidized, 55% had been converted to 3,4-dihydro-1(2H)-naphthalenone, and 17.5% to 1,2-dihydronaphthalene. Based on the 1,2,3,4-tetrahydronaphthalene oxidized, the yield was 64% 3,4-dihydro-1(2H)-naphthalenone and 21% 1,2-dihydronaphthalene.

*Example 4*

Similar results to those of Examples 1–3 are obtained when 2-methyl-1,2,3,4-tetrahydronaphthalene is used in place of 1,2,3,4-tetrahydronaphthalene itself. However, in this case a mixture of two 3,4-dihydro-1(2H)-naphthalenones is obtained: 2-methyl-3,4-dihydro-1(2H)-naphthalenone (1 - keto-2-methyltetrahydronaphthalene) and 4-methyl-3,4-dihydro-1(2H)-naphthalenone (1-keto-4-methyltetrahydronaphthalene), with the former being the predominant isomeric 3,4-dihydro-1(2H)-naphthalenone in the product.

*Example 5*

Similar results to those obtained in Examples 1–3 are obtained when 6-methyl-1,2,3,4-tetrahydronaphthalene is oxidized in place of 1,2,3,4-tetrahydronaphthalene. In this case, the 3,4 - dihydro-1(2H)-naphthalenone product is a mixture of the two isomeric 3,4-dihydro-1(2H)-naphthalenones, 6-methyl-3,4-dihydro - 1(2H) - naphthalenone and 7 - methyl-3,4 - dihydro-1(2H)-naphthalenone. These two 3,4-dihydro-1(2H)-naphthalenones may also be named 1-keto-6-methyltetrahydronaphthalene and 1-keto-7-methyltetrahydronaphthalene.

*Example 6*

Similar results to those obtained in Examples 1–3 are obtained when 2,6 - dimethyl - 1,2,3,4 - tetrahydronaphthalene is oxidized in place of the 1,2,3,4-tetrahydronaphthalene. In this case the 3,4-dihydro-1(2H)-naphthalenone product is a mixture of both the 2,6-dimethyl-3,4-dihydro-1(2H)-naphthalenone (1-keto-2,6-dimethyltetrahydronaphthalene) and 4,7-dimethyl-3,4 - dihydro-1(2H)-naphthalenone (1-keto-4,7 - dimethyltetrahydronaphthalene).

Although the foregoing examples have described a number of variations and modifications which may be employed in the practice of the present invention, it should be understood that my invention is also applicable to reactants, reaction conditions and proportions of ingredients taught in the specification but not specifically illustrated by the examples. The 3,4-dihydro-1(2H)-naphthalenones prepared by the method of this invention exhibit the same utility as the same compounds prepared by any other method. Thus, the 3,4-dihydro-1(2H)-naphthalenones may be dehydrogenated with a dehydrogenating agent, for example, sulfur, to produce the corresponding α-naphthols, which are useful as antioxidants, for example, in the compounding of rubber.

In the foregoing, it is evident that a facile, unique, and original oxidation product has been described. The foregoing detailed description has been given for clearness of understanding only, and no unnecessary limitations are to be understood therefrom. The invention is not limited to the exact details shown and described, since obvious modifications will occur to those skilled in the art. It is therefore to be understood that changes may be made in the particular embodiments of the invention described which are within the full intended scope of the invention as defined by the appended claims.

I claim:

1. The process of making an 3,4-dihydro-1(2H)-naphthalenone which comprises reacting oxygen with a 1,2,3,4-tetrahydronaphthalene selected from the group consisting of 1,2,3,4-tetrahydronaphthalene and 1,2,3,4-tetrahydronaphthalenes having two α-methylene groups and from one to two methyl groups as the sole substituents, in a homogeneous liquid phase containing no more than 5% by weight water, and having dissolved therein an alkaryl hydrocarbon whose alkyl substituents have from 1 to 8 carbon atoms, at least one of said alkyl groups having an α-hydrogen, and a catalyst consisting essentially of a cobalt bromide carboxylate, wherein the carboxylate moiety of the catalyst is the carboxylate moiety of a carboxylic acid selected from the group consisting of (a) saturated aliphatic carboxylic acids having up to 18 carbon atoms, wherein the substituents on the carbon atoms on the carboxylate moiety are selected from the group consisting of hydrogen, hydroxyl, bromine, alkoxy, hydrocarbon carboxy acyl, and alkoxycarbonyl, (b) benzene carboxylic acids, wherein the substituents on the benzene ring are selected from the group consisting of hydrogen, alkyl, halogen, alkoxycarbonyl, alkylthio, alkylsulfinyl and arylsulfonyl, and (c) naphthalene carboxylic acids, the ratio of bromine to cobalt present in the liquid phase being in the range of 0.008 to 1.9 atoms of bromine per atom of cobalt, and the rate of oxygen being admitted to the reaction mixture being fast enough to cause the reaction mixture to be heated by the reaction of the 1,2,3,4-tetrahydronaphthalene with oxygen.

2. The process of claim 1 in which a lower alkyl carboxylic acid is employed as a solvent.

3. The process of making an 3,4-dihydro-1(2H)-naphthalenone which comprises reacting oxygen with a 1,2,3,4-tetrahydronaphthalene selected from the group consisting of 1,2,3,4-tetrahydronaphthalene and 1,2,3,4-tetrahydronaphthalenes having two α-methylene groups and from one to two methyl groups as the sole substituents, in a homogeneous liquid phase containing no more than 5% by weight water, and having dissolved therein an alkaryl hydrocarbon whose alkyl substituents have from 1 to 8 carbon atoms, at least one of said alkyl groups having an α-hydrogen, and a catalyst consisting essentially of a cobalt bromide carboxylate, wherein the carboxylate moiety of the catalyst is a carboxylate moiety of a lower alkyl carboxylic acid, the ratio of bromine to cobalt present in the liquid phase being in the range of 0.1 to 1.2 atoms of bromine per atom of cobalt, and the rate of oxygen being admitted to the reaction mixture being fast enough to cause the reaction mixture to be heated by the reaction of the 1,2,3,4-tetrahydronaphthalene with oxygen.

4. The process of claim 3 wherein the compound oxidized is 1,2,3,4-tetrahydronaphthalene.

5. The process of claim 3 in which the compound oxidized is 1,2,3,4-tetrahydronaphthalene having two α-methylene groups and one methyl group as its sole substituent.

6. The process of claim 3 in which the compound oxidized is 1,2,3,4-tetrahydronaphthalene having two α-methylene groups and two methyl groups as its sole substituents.

7. The process of producing an 3,4-dihydro-1(2H)-naphthalenone which comprises reacting oxygen with a 1,2,3,4-tetrahydronaphthalene selected from the group consisting of 1,2,3,4-tetrahydronaphthalene and 1,2,3,4-tetrahydronaphthalenes having two α-methylene groups and from one to two methyl groups as the sole substituents, in a homogeneous liquid phase containing no more than 5% by weight water, and having dissolved therein an alkaryl hydrocarbon whose alkyl substituents have from 1 to 8 carbon atoms, at least one of said alkyl groups having an α-hydrogen, and a catalyst consisting essentially of cobalt acetate bromide, the ratio of the bromine and cobalt present in the liquid phase being in the range of 0.1 to 1.2 atoms of bromine per atom of cobalt, the rate of oxygen being admitted to the reaction mixture being fast enough to cause the reaction mixture to be heated by the reaction of the 1,2,3,4-tetrahydronaphthalene with oxygen.

8. The process of claim 7 wherein the compound oxidized is 1,2,3,4-tetrahydronaphthalene.

9. The process of claim 7 in which the compound oxidized is a 1,2,3,4-tetrahydronaphthalene having two α-methylene groups and one methyl group as its sole substituent.

10. The process of claim 7 in which the compound oxidized is 1,2,3,4-tetrahydronaphthalene having two α-methylene groups and two methyl groups as its sole substituents.

References Cited by the Examiner
UNITED STATES PATENTS

| | | | |
|---|---|---|---|
| 2,859,247 | 11/1958 | de Radzitsky et al. | 260—590 |
| 2,920,087 | 1/1960 | Hay | 260—597 |
| 3,038,940 | 6/1962 | Serres et al. | 260—590 |

DANIEL D. HORWITZ, *Primary Examiner.*

LEON ZITVER, *Examiner.*